(12) United States Patent
Aihara et al.

(10) Patent No.: US 6,183,145 B1
(45) Date of Patent: Feb. 6, 2001

(54) CAMERA SYSTEM

(75) Inventors: Yoshihiko Aihara; Masayoshi Yamamichi, both of Kanagawa-ken; Masahisa Fujino, Tokyo, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 07/607,147

(22) Filed: Oct. 31, 1990

Related U.S. Application Data

(63) Continuation of application No. 07/471,034, filed on Jan. 26, 1990, now abandoned, which is a continuation of application No. 07/267,655, filed on Nov. 3, 1988, now abandoned, which is a continuation of application No. 07/012,862, filed on Feb. 10, 1987, now abandoned.

(30) Foreign Application Priority Data

| Feb. 13, 1986 | (JP) | 61-029767 |
| Feb. 13, 1986 | (JP) | 61-029768 |
| Feb. 17, 1986 | (JP) | 61-021416 U |

(51) Int. Cl.[7] .................................................. C03B 7/00
(52) U.S. Cl. .................................... 396/529; 396/532
(58) Field of Search ............................ 396/71, 529, 530, 396/532, 533

(56) References Cited

U.S. PATENT DOCUMENTS

| 4,104,650 | * | 8/1978 | Hosoe et al. ............... 354/225 X |
| 4,404,595 | * | 9/1983 | Ushiro et al. ............... 354/25 X |
| 4,416,523 | * | 11/1983 | Kawabata ................... 354/25 |
| 4,464,034 | * | 8/1984 | Tomino ...................... 354/286 |
| 4,472,040 | * | 9/1984 | Kawabata .................... 354/406 |
| 4,474,447 | * | 10/1984 | Kawabata et al. ............ 354/406 |
| 4,527,879 | * | 7/1985 | Hosoe et al. ................ 354/400 |
| 4,545,664 | * | 10/1985 | Sakai et al. ................ 354/400 |
| 4,545,665 | * | 10/1985 | Aihara ....................... 354/402 |
| 4,620,780 | * | 11/1986 | Maekawa et al. ............. 354/286 |
| 4,637,704 | * | 1/1987 | Ishimura et al. ............. 354/286 |
| 4,647,171 | * | 3/1987 | Yamaki ....................... 354/286 |
| 4,653,889 | * | 3/1987 | Haneishi ..................... 354/286 |
| 4,687,915 | * | 8/1987 | Sakai et al. ............... 354/402 X |
| 4,748,467 | * | 5/1988 | Maekawa et al. ............. 354/286 |
| 4,790,649 | * | 12/1988 | Harada et al. ............... 354/400 |
| 4,862,208 | * | 8/1989 | Yamada et al. .............. 354/485 |

FOREIGN PATENT DOCUMENTS 58-83823 * 5/1983 (JP) .

OTHER PUBLICATIONS

U.S. application No. 06/688,355, filed Jan. 2, 1985.*

* cited by examiner

*Primary Examiner*—Safet Metjahic
*Assistant Examiner*—Michael Dalakis
(74) *Attorney, Agent, or Firm*—Robin, Blecker & Daley

(57) ABSTRACT

A camera system includes a camera body and a lens in which a motor circuit and an electric circuit are arranged and are supplied with electric power from a power source in the camera body. Ground contact terminals for the motor circuit and the electric circuit are separately arranged in the lens, and the motor circuit and the electric circuit are electrically connected to the power source negative terminal through the separate ground contact terminals.

15 Claims, 2 Drawing Sheets

CAMERA SYSTEM

This application is a continuation of Ser. No. 07/471,034 filed Jan. 26, 1990, now abandoned, which is a continuation of Ser. No. 07/267,655 filed Nov. 3, 1988, now abandoned, which is a continuation of Ser. No. 07/012,862 filed Feb. 10, 1997, now abandoned.

BACKGROUND OF THE INVENTION

1. Field of the Invention

The present invention relates to a camera and, more particularly, it relates to a camera of lens-interchangeable type including a camera body and an interchangeable lens in which an electric connection of the interchangeable lens with the camera body is improved.

2. Description of the Related Art

Recently an automatic camera has become widely used. Such an automatic camera includes an automatic exposure control device, an automatic focusing device and/or an automatic light adjusting device, so that various electronic circuits, motor, battery or the like are mounted in the camera.

In the case of a camera of lens-interchangeable type, including a camera body and an interchangeable lens, in which various devices as mentioned above are contained, a motor, electronic circuits and the like are arranged in the camera body as well as in the interchangeable lens. Accordingly, electric contacts or connecting terminals for electrically connecting the various device in the camera body with those in the interchangeable lens are arranged on mount portions for connecting the camera body with the lens.

In the conventional camera of lens-interchangeable type, it has been the usual practice to arrange a ground line and a connecting terminal for the motor mounted in the lens and those for the electronic circuit so that they are commonly used, in order to reduce the number of connecting terminals. However, in the system in which the ground lines and the connecting terminals are arranged for common use, there is a danger that the electronic circuits of the lens and the camera body may be damaged owing to difference in ground potential between them.

For example, in the construction wherein electric power is transmitted from a power source in the camera through a power supply line and a terminal to the lens to supply the power to a motor circuit and/or an electronic circuit in the lens, at the time of supplying the power to the motor circuit the power is fed from the power source in the camera body through said power line to the motor circuit and then returned through the ground line and the terminal to said power source, so that a closed loop is formed to provide a power feeding path for the motor circuit. In this case, the current passing through the motor circuit is relatively large, so that said current produces a voltage drop at the ground line and the terminal when it is returned through said ground line and said terminal to the power source. If this ground line was commonly used in the motor circuit and the electronic circuit of the lens, the ground potential of the electronic circuit would be increased, by the amount of the above-mentioned voltage drop, as compared with the normal level, with the result that the electronic circuit of the lens would be adversely affected thereby.

Furthermore, in a camera of the above-mentioned type, if the lens was not properly mounted on the camera body, the contact terminals of the camera body and the lens would not be properly connected. Such a state would cause an accident wherein the lens could not be driven even if an instruction was sent from the camera body to the lens to effect some operation, such as driving of the motor and, moreover, such a state could produce various electrical accidents.

In order to avoid such accidents, a device for detecting the mounting of the lens, which is constructed to allow transmitting and receiving signals between the camera body and the lens only when the lens is properly mounted on the camera body, has been proposed, for example, in U.S. Pat. No. 4,492,429 and Pat. No. 4,464,034, etc. The device as proposed in these patents includes a switch associated with a mount locking member, which is so constructed that when the lens has been completely mounted on the camera body the mount locking member is pressed by the mount of the lens, with the result that said switch is actuated by said mount locking member.

However, according to the proposed construction in which the operation of the switch is effected by the mount locking member, it is quite possible that an operator may erroneously unlock said mount locking member owing to his careless operation. If the operator erroneously unlocked the mount locking member, the feeding of power to the electronic circuit in the lens would be broken, so that the transmitting and receiving signals between the camera body and the lens would become impossible, thereby making the operation of the camera itself impossible.

SUMMARY OF THE INVENTION

It is an object of the present invention to remove the problems caused by common use of a ground line in the motor circuit and the electronic circuit in the lens.

In accordance with an aspect of the present invention there is provided a camera system including a camera body having a power source mounted therein and a lens having a driving motor and an electronic circuit arranged therein, wherein the driving motor and the electronic circuit have separate ground lines and terminals, so that a power is supplied from the power source in the camera body to said motor and said electronic circuit through the ground lines and the terminals, separately.

In accordance with another aspect of the present invention there is provided a camera system including a camera body having a power source and an electronic circuit mounted therein and an interchangeable lens having a driving motor and an electronic circuit mounted therein, in which a power ground line for grounding the motor in the lens and a signal ground line for grounding the electronic circuit in the lens and the electronic circuit in the camera body are separately provided for exclusive use, respectively, and in which a connecting terminal for exclusive use for power grounding which is connected to said power ground line and a connecting terminal for exclusive use for signal grounding which is connected to the ground line of the electronic circuit in said lens are disposed separately in an inside peripheral area of a mount formed on the camera body to mount the lens, thereby avoiding the problems caused by common use of the ground line as mentioned above.

In accordance with a further aspect of the present invention there is provided a camera system including a camera body having a power source and an electronic circuit mounted therein and a lens having a driving motor and an electronic circuit mounted therein, in which a signal for instructing start of the driving motor or the like is transmitted from the camera body to the lens through contacts formed on the lens and the camera body to effect control of the start of the driving motor, etc. in the lens; said camera system comprising mount means in the form of a bayonet type to be attached or detached by rotation, and a device for detecting the mounting of the lens onto the camera body which is arranged to come into contact with a part of a mount on the lens to be driven thereby at the terminal period of rotating motion of the mount on the lens during mounting the lens onto camera body, whereby the transmitting and receiving of said signal is allowed after detecting the proper mounting of the lens onto the camera body.

The other features and the objects of the present invention will be understood from the description of the embodiments of the present invention with reference to the drawings.

DETAILED DESCRIPTION OF THE PREFERRED EMBODIMENT

Now, a preferred embodiment of the present invention will be described with reference to the drawings.

Figure 1:
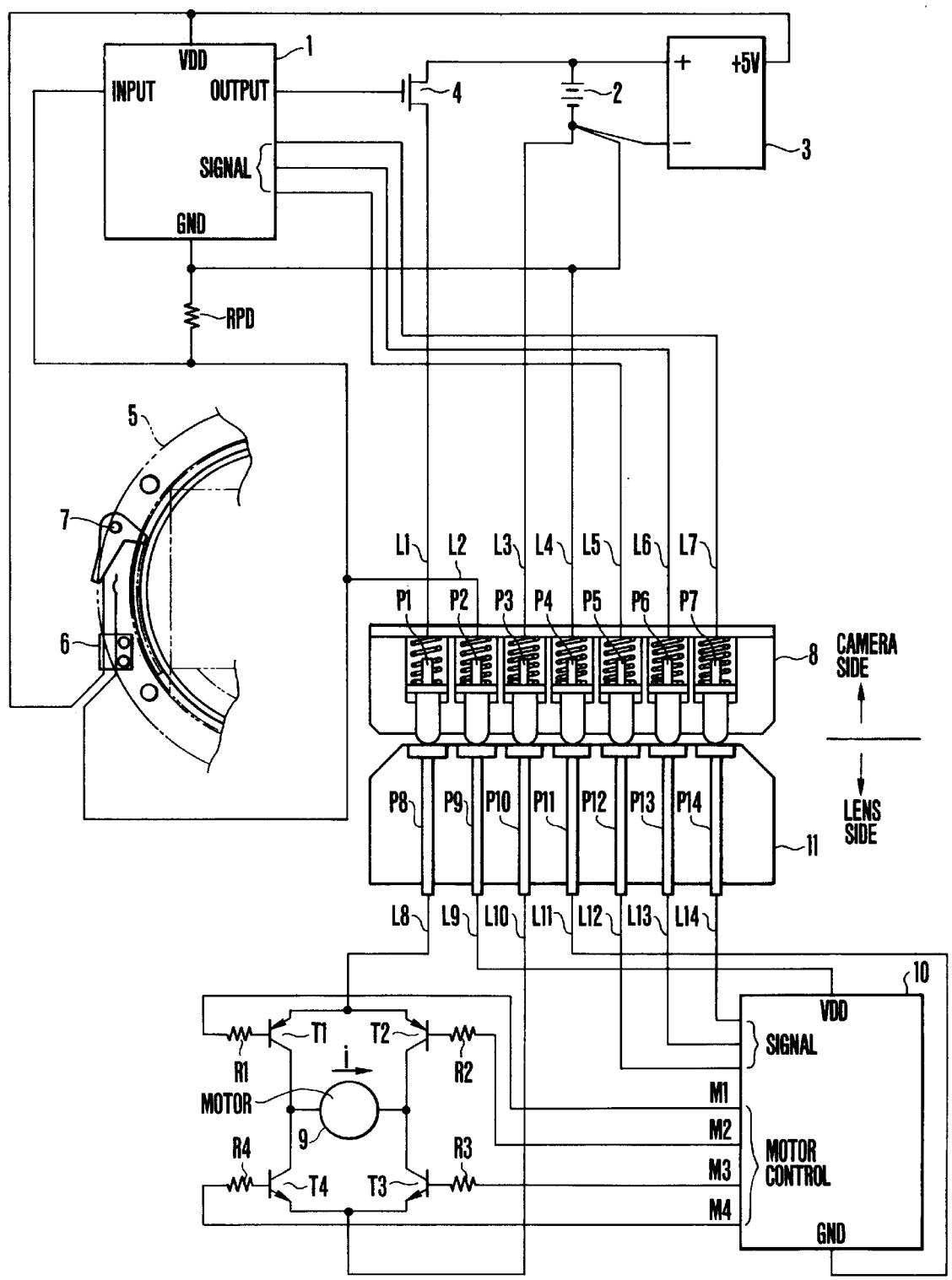
FIG. 1 is a circuit diagram showing an embodiment of the camera system which includes the connecting arrangement according to the present invention.

Referring to FIG. 1, the camera body includes an electronic circuit 1, a power source 2 such as a battery, a constant voltage output circuit 3 arranged to receive an electric power from said power source 2 and supply a constant voltage to said electronic circuit 1 and an electronic circuit mounted in the lens, as hereinafter described, an analog switch 4 arranged to turn on or off an electric power to be supplied to a motor (hereinafter described) mounted in the lens, a mount 5 arranged on the camera body to mount the lens thereon, a switch 6 arranged near said mount 5 to detect the mounting of the lens onto the camera body, and a member 7 arranged to be responsive to the mounting and demounting of the lens onto and from the camera body to actuate said switch 6. The member 7 is a rocking member which is pivotally mounted on the rear side of the mount 5. This member has two arms on opposite sides of its pivot point, and one of said arms is arranged to be engaged with and driven by a part of the mount at the side of the lens for connecting the camera body, while the other of said arms is arranged to urge one of the switch pieces of the switch 6 to detect the mounting of the lens onto the camera body.

The switch 6 for detecting the mounting of the lens has two switch pieces. These switch pieces are separated apart from each other when the lens is not mounted on the camera body, while they come into contact with each other when the lens is mounted on the camera body, thereby connecting the input terminal of the electronic circuit 1 and the output terminal of the constant voltage output circuit 3 with each other.

The camera body has a connecting terminal base 8 which is disposed in the inside peripheral area of the lower part of the mount 5 which is arranged to mount the lens on the camera body. Said connecting terminal base 8 has a plurality of connecting terminals (or contact pins) P1–P7 which are arranged to come into contact with a plurality of connecting terminals (or electrical contacts) provided on the lens, respectively. Each of these connecting terminals P1–P7 is energized by a spring so that it is projected forwardly of the front surface of said terminal base 8. The connecting terminals are separately connected with lines L1–L7, respectively, formed on a print circuit board mounted on the camera body.

The line L1 connected with the terminal P1 constitutes a motor power source line which is arranged to supply an electric power from the power source 2 in the camera body to a motor (hereinafter described) in the lens, and the analog switch 4 as described above is connected in said line L1.

The line L2 connected with the terminal P2 is connected with the switch 6 for detecting the mounting of the lens and it is also connected with the input terminal of the electronic circuit 1. The line L3 connected with the terminal P3 constitutes a power ground line, which is connected to a negative electrode of the power source 2.

The line L4 connected with the terminal P4 is arranged to be connected with a ground line of the electronic circuit in the lens, as hereinafter described, and said line L4 is connected with the ground terminal of the electronic circuit 1 in the camera body and the negative electrode of the power source 2.

The lines L5–L7 connected with the connecting terminals P5–P7, respectively, constitute signal lines which carry signals between the electronic circuit 1 in the camera body and the electronic circuit in the lens. These lines L5–L7 are connected with the signal terminals of the electronic circuit 1.

The interchangeable lens is arranged to be detachably attached to the camera body which is constructed as explained above. The interchangeable lens includes, mounted therein, a motor 9 for driving an automatic focusing mechanism, a motor control switch for changing over a feeding direction of an energizing current of said motor 9 and an electronic circuit 10 arranged to send and receive various signals to and from the electronic circuit 1 in the camera body. The interchangeable lens further includes a camera connecting mount (not shown) arranged to be detachably connected to the lens connecting mount on the camera body, and a connecting terminal base 11 which is disposed in the inside peripheral area of the lower part of said camera connecting mount in opposing relation to the connecting terminal base 8 of the camera body.

The connecting terminal base 11 provided on the interchangeable lens has seven connecting terminals (or contact pins) P8–P14 which are arranged to contact with the connecting terminals P1–P7 on the camera body, respectively, as shown in FIG. 1. The connecting terminals P8–P14 have lines L8–P14 which are separately connected with these terminals.

The lines L8 and L10 are connected with the motor 9 through a motor control device, which will be hereinafter described, and they constitute power lines for passing larger current, as compared with the other lines L9 and L11–L14. The line L8 forms a power supply line for the motor and the line L10 forms a power ground line for grounding one pole of the motor 9, as hereinafter described.

The line L9 connected with the terminal P9 constitutes a power supply line for the electronic circuit to supply a current to the electronic circuit 10 in the lens. This line is arranged to be connected with the power source terminal of the electronic circuit 10 and also connected through the connecting terminals P9 and P2 with the line L2 in the camera body.

The line L11 is arranged to be connected with the ground terminal of the electronic circuit 10 and also connected through the connecting terminals P11 and P4 with the line L4 in the camera body, thereby constituting a signal ground line of the electronic circuit 10 in the interchangeable lens.

The lines L12–L14 are connected with the signal terminals of the electronic circuit 10 and also separately connected with the connecting terminals P12–P14. Furthermore, they are arranged to be connected through the connecting terminals P12–P14 at the lens side and the terminals P5–P7 at the camera body side with the lines L5–L7 in the camera body, separately. Thus, the lines L12–L14 constitute signal lines at the lens side.

The motor control device for changing over the current feeding direction of the motor is constituted by four transistors T1–T4, including two pairs of NPN transistor and PNP transistor, and one of the pairs is connected with one pole of the motor 9, while the other pair is connected to the other pole of the motor 9. The PNP transistors T1 and T2 of the respective pairs are connected with the line L8 in the interchangeable lens and said line L8 is connected through the connecting terminal P8 in the connecting terminal base 11 with the line L1 in the camera body. (In other words, the line L8 together with the line L, constitute a power feeding line to feed an electric power to the motor 9.)

One pole of the motor 9 is connected with the respective collectors of the pair of PNP transistor T1 and NPN transistor T4, while the other pole of the motor 9 is connected with the respective collectors of the pair of PNP transistor T2 and NPN transistor T3. On the other hand, the emitters of the NPN transistors T3 and T4 of the respective pairs of transistor are connected with the line L10. The line L10 constitutes a power ground line disposed in the interchangeable lens. Said line L10 serves to connect the negative pole side of the motor 9 through the connecting terminal P10 to the connecting terminal P3 at the camera body side. It is connected through the line L3 at the camera body side to the negative electrode of the power source 2.

The electronic circuit 10 has control terminals to control the respective transistors T1–T4 of the motor control device, and the respective control terminals are connected with the bases of the respective transistors T1–T4 by signal lines M1–M4, respectively. The signal lines include resistors R1–R4, respectively.

As explained above, the characteristic feature of the present invention resides in the fact that the ground line and the connecting terminal for the ground line for the motor 9 is separate from those for the electronic circuit, and they are arranged for exclusive use, respectively. Now, the operation of the parts of the construction as shown in the drawings will be explained.

(i) In the case where the lens is not mounted on the camera body:

When the lens is not mounted on the camera body, the terminal base 11 of the lens is separated apart from the terminal base 8 of the camera body. Accordingly, the connecting terminals P1–P4 of the camera body and the connecting terminals P6–P14 of the camera body are not contacted with each other. The detecting switch 6 provided on the lens connecting mount 5 of the camera body to detect the mounting of the lens is in such state that the two switch pieces are separated apart from each other. Accordingly, the input terminal of the electronic circuit 1 is connected through a pressure reducing resistor PRD with the negative side of the power source 2 and thus the electronic circuit is in such state that a voltage at low level near the ground potential is applied to said input terminal. Therefore, a voltage at high level to hold the analog switch 4 in OFF state (open state) is produced from the output terminal, so that the analog switch 4 is held off and thus the connecting terminal P1 is cut off from the power source 2.

(ii) In the case where the lens is mounted on the camera body:

When the lens is mounted on the camera body, the mount provided on the lens is rotated in clockwise direction, as viewed in the drawings, relatively to the lens connecting mount 5. Accordingly, the member 7 responsive to the mounting and demounting of the lens is rotated in counter-clockwise direction around its pivot point by the camera connecting mount of the lens, with the result that one switch piece of the detecting switch 6 is pushed by one arm of the detecting switch 6, so that the switch pieces of said detecting switch 6 come into contact with each other and thus said switch 6 comes into ON-state. Accordingly, the 5V output terminal of the constant voltage output circuit 3 is connected through said switch 6 with the input terminal of the electronic circuit 1, so that the input voltage at high level (5 volt) is applied to said input terminal. Therefore, the voltage level at the output terminal of the electronic circuit 1 is converted from "H" to "L" and the analog switch 4 comes into ON-state, so that the positive side of the power source 2 is connected with the connecting terminal P1.

When the lens has been completely mounted onto the lens connecting mount 5 of the camera body, the connecting terminals P1–P7 at the camera side come into contact with the connecting terminals P8–P14 at the lens side, as shown in FIG. 1, so that the lines L1–L7 at the camera body side are connected through the connecting terminals P1–P14 with the lines L8–L14 at the lens side, with the result that the connection as shown in FIG. 1 is completed. (In this regard, it is to be noted that although the detecting switch 6 is shown in open state in FIG. 1, said switch 6 is held in closed state when the lens has been completely mounted on the camera body.)

After completely mounting the lens onto the camera body, control signals concerning the operation (mainly, the focusing operation) of the camera is transmitted from the electronic circuit of the camera body through the lines L5–L7 and lines L12–L14 to the electronic circuit 10 of the lens and at the same time signals concerning the motor 9 are transmitted from the electronic circuit 10 of the lens to the electronic circuit 1 of the camera. For example, it is assumed that the electronic circuit 1 transmits control signals to cause the electronic circuit 10 to produce a signal at "L" level on the line M1 and a signal at "H" level on the line M3. Then, the transistors T1 and T3 are made conductive and a current is fed through the line L8 and the transistor T1 to the motor 9 in the direction as indicated by an arrow i in FIG. 1, so that the motor 9 is rotated in forward direction. Said current is passed through the transistor T3, the line L10, the connecting terminals P10 and P3 and the line L3 and returned to the negative side of the power source 2.

If signals are transmitted from the electronic circuit 1 through the lines L5–L7 to the electronic circuit 10 to rotate the motor 9 in reverse direction, the electronic circuit 10 produces a signal at "L" level on the line M2 and a signal at "H" level on the line M4 (at this time, the signal on the line M1 is at "H" level and the signal on the line M3 is at "L" level), with the result that the transistors T2 and T4 are made conductive and a current is fed through the transistor T2 to the motor 9 in the direction opposite to that indicated by the arrow i, so that the motor 9 is rotated in reverse direction.

Whether the motor 9 is rotated in forward direction or reverse direction, as explained above, the current from the motor 9 is returned through the line L10 and the connecting terminal P10 at the lens side and then through the connecting terminal P3 and the line L3 at the camera body side to the negative electrode of the power source 2. At the time when the current is being fed to the motor 9, as described above, a contact resistance is produced at the connection between the connecting terminals P10 and P3 (that is, a voltage drop is produced) and, consequently, a difference is produced between a potential of the line L10 at the lens side and a potential of the line L3 (namely, the ground potential of the power source 2) at the camera body side. Therefore, the actual ground potential of the motor 9 is substantially increased as compared with the ground potential of the power source 2. (For example, if it is assumed that the current fed to the motor 9 is 1A and the contact resistance between the connecting terminals P3 and P10 is 1Ω, then the ground potential of the motor 9 is not 0V but 1V.)

In the conventional camera of lens-interchangeable type, the ground line and the connecting terminal for grounding are arranged for common use by the electronic circuit and the motor, so that the ground potential of the electronic circuit 10 in the lens varies depending upon the current fed into the motor 9, and the ground potential of the electronic circuit in the lens may become higher than the value of the signal potential when a large current is fed into the motor 9. If the ground potential of the electronic circuit is increased to such extent, the electronic circuit in the lens may be damaged.

As compared with the conventional camera as described above, the present invention provides a camera in which the signal ground line and the connecting terminal for the electronic circuit and the ground line and the connecting terminal for the motor are arranged in independent from, for exclusive use, respectively, so that there is no possibility that the electronic circuit is adversely affected by the motor.

Figure 2:
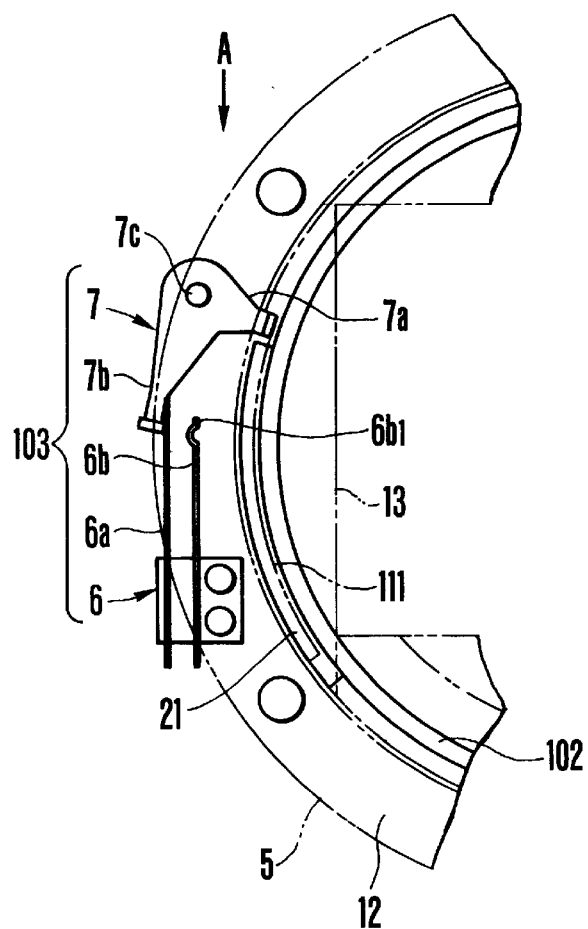
FIG. 2 is a front view showing the state where the mount at the lens side is being connected with the mount at the camera body side.
Figure 3:
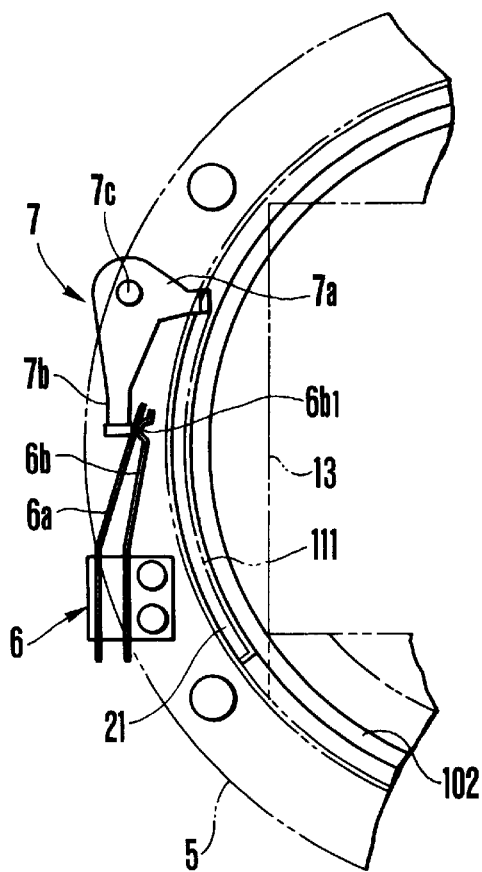
FIG. 3 is a front view showing the state where the mount at the lens side has been completely connected with the mount at the camera body side.
Figure 4:
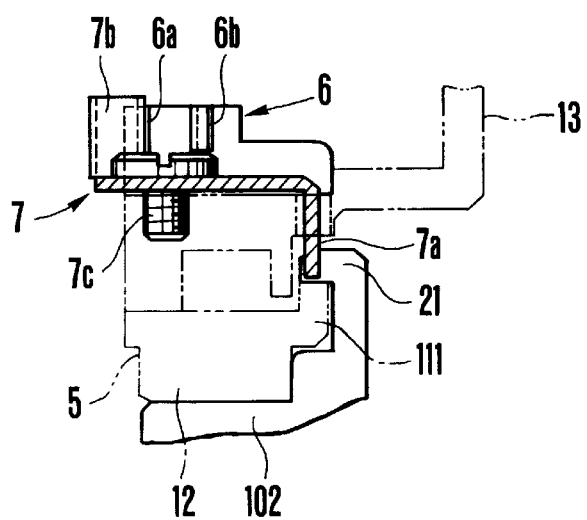
FIG. 4 is a plan view, partly in section, seen in the direction indicated by the symbol A from the rear side.

FIGS. 2 and 3 are detailed front views showing the mount on the camera body as shown in FIG. 1. FIG. 2 illustrates the state where the mount at the side of the lens is being mounted onto the mount at the side of the camera body and the detecting device for detecting the mounting of the lens is at the position just before starting its operation. FIG. 3 illustrates the state where the lens has been completely mounted onto the camera body. FIG. 4 is a plan view, partly in section, seen in the direction as indicated by the arrow A in FIG. 2.

Referring to FIGS. 2–4, the camera body has the mount 5 as described above, while the lens has a mount 102 which is arranged to be detachably connected to said mount 5. The mount 5 at the camera body has an abutting surface 12 and three pawls projecting inside of said abutting surface, one of said pawls being indicated by numeral 111. The mount at the lens side has a pawl 21 which engages with said one pawl 111 of the mount. The camera body has a mirror box 13 therein.

The member 7 responsive to the mounting of the lens, which forms a part of the detecting device 103 for detecting the mounting of the lens, is arranged at the rear side of the abutting surface 12 of the mount 5. The responsive member 7 is actuated by the rotating operation of the mount 102 of the lens at the time of mounting the lens onto the mount 5 of the camera body and at the time of demounting the lens from said mount 5. In the embodiment illustrated in these drawings, the member 7 is a rocking member having two arms 7a and 7b. The responsive member 7 is pivotally supported at its base portion of the arms 7a and 7b on the rear side of the mount 5 of the camera body by means of a pivot pin 7c which extends in parallel with the optical axis of the camera. The forward end of the one arm 7a is arranged to project to the terminal end position of the area of rotation of the pawl 21 of the mount 102 of the lens and come into engagement with said pawl 21. (In other words, the forward end of the arm 7a is so positioned that it comes into engagement with the pawl 21 of the mount of the lens at the terminal period of the rotation of the rotation of the mount 102 during mounting the lens onto the camera body.)

The forward ends of the arms 7a and 7b are bent at right angle in opposite directions to each other with respect the plane of FIG. 2. The forward end of the other arm 7b engages with one of a switch pieces 4a of the switch 6 arranged on the rear side of the mount 5 of the camera body. The switch 6 and the responsive member 7 constitute the detecting device 103 for detecting the mounting of the lens, and said switch includes two switch pieces 6a and 6b having high elastic repulsive force. These switch pieces 6a and 6b are arranged in parallel relationship to each other, so that these pieces are separated to hold its OFF state, as shown in FIG. 2, unless an external force is applied thereto. When the switch piece 6a is pushed by the arm 7b of the responsive member 7 as shown in FIG. 3, said switch piece 6a comes into contact with the bent portion 6b, of the switch is turned ON.

Now the description will be made to the operation of the several parts of the construction as described above at the time of mounting and demounting the interchangeable lens onto and from camera body.

When the lens is not mounted on the mount 5 of the camera body or the lens is not completely mounted on said mount, the responsive member 7 is in the position as shown in FIG. 2, where the two switch pieces 6a and 6b of the switch 6 are separated from each other, that is, the switch is in OFF position.

At the time of mounting the lens on the camera body, the mount 102 of the lens is fitted with the mount 5 of the camera body and then the mount 102 of the lens is rotated in the clockwise direction relatively to the mount 5 of the camera body. Then the pawl 111 of the mount of the camera body comes into engagement with the pawl 21 of the lens. However, before the pawl 21 of the mount of the lens reaches the terminal end of its rotation (that is, immediately before the lens is completely mounted), the pawl 21 of the mount of the lens does not come into engagement with the arm 7a of the responsive member 7, so that the switch 6 is not turned ON. When the mount 102 is further rotated in the clockwise direction from the state shown in FIG. 2, the pawl 21 of the mount of the lens pushes the arm 7a of the member 7 in upward direction, as viewed in FIG. 2, so that the member 7 is rotated in clockwise direction around the pivot pin 7c, with the result that the other arm 7b pushes the switch piece 6a of the switch 6. Accordingly, the switch pieces 6a and 6b come into contact with each other, as shown in FIG. 3, and thus the switch 6 is turned ON, while the pawl 21 of the mount of the lens stops at a predetermined position. Thus the lens is completely mounted on the camera body (as shown in FIG. 2).

When demounting the lens from the camera body on which the lens is completely mounted as shown in FIG. 3, the mount 102 of the lens is rotated in counter-clockwise direction relatively to the mount 5 of the camera body, as viewed in FIG. 3. As the rotation is started, the force acting to energize the arm 7a of the member 7 in upward direction disappears, so that there is no obstruction against the arm 7a. Thus the member 7 is rotated in clockwise direction around the pivot pin 7c under the elastic restoring force of the switch piece 6a acting to push the other arm 7b, and at the same time the switch piece 6a is separated from the switch piece 6b, so that the switch 6 is turned OFF. This OFF state is produced when the pawl 21 of the mount of the lens is slightly rotated in counter-clockwise direction from the position shown in FIG. 3 (that is, immediately after the lens is moved from the completely mounted state to the incompletely mounted state). In other words, the switch is turned OFF, when the lens is moved, even slightly, from the completely mounted state.

It will be understood that the present invention provides a camera system in which the damage or the malfunction of the electronic circuit of the lens side and/or the electronic circuit of the camera body side which may be caused by the current fed to the motor in the lens is completely avoided. The malfunction of the camera is further avoided, since the feeding of power from the camera body to the lens is prohibited if the lens is not properly mounted on the camera body.

Although the member 7 responsive to the mounting of the lens is shown as constructed to operate the switch 6 by the one arm 7b in the embodiment as described above, the construction may be modified such that the pivot pin 7c of the member 7 is arranged as a rotary shaft which is rotated with said member 7 and a contactless switch is associated with said rotary shaft.

What is claimed is:

1. An accessory device constituting at least part of a photographic optical system and adapted to be mounted on a camera, said camera including a power source therein, a mount, a first electric circuit for producing control signals, first terminal means for outputting said control signal, second terminal means for supplying power from said power source, and first and second ground terminals for said power source, said first and second ground terminals being connected to said power source through separate electrical conductors, said accessory device comprising:
   (a) means for attaching the accessory device onto said mount of the camera;
   (b) third terminal means to be connected with said second terminal means when said accessory device is mounted on the camera and third and fourth ground terminals to be independently connected with said first and second ground terminals, respectively, said third terminal means and said third ground terminal being arranged so as to supply power to a motor circuit, said third terminal means and said fourth ground terminal being arranged so as to supply power to a second electric circuit; and
   (c) fourth terminal means to be connected with said first terminal means when said accessory device is mounted on the camera, said fourth terminal means being arranged to transmit said control signals to an input terminal means of said second electric circuit for operating said second electric circuit in accordance with said control signals.

2. An accessory device according to claim 1, wherein said second terminal means of the camera includes first and second power supply terminals, and said third terminal means includes one terminal connected to a power supply line of said motor circuit and another terminal connected to a power supply line of said second electric circuit, said first and second power supply terminals being independently connected respectively with said one and such other terminal of said third terminal means.

3. An accessory device according to claim 2, wherein said second electric circuit produces signals for controlling said motor circuit in accordance with said control signals.

4. An accessory device according to claim 2, wherein power source includes a battery and a power source circuit generating an output based upon an output of said battery, said first power supply terminal being connected to receive the output of the battery and said second power supply terminal being connected to receive the output of said power source circuit.

5. An accessory device constituting at least part of a photographic optical system and adapted to be mounted on a camera, said camera including a power source therein, a mount, a first electric circuit for producing control signals, first terminal means for outputting said control signals, second terminal means for supplying power from said power source, and first and second ground terminals for said power source, said first and second ground terminals being connected to said power source through separate electrical conductors, said accessory device comprising:
   (a) means for attaching the accessory device onto said mount of the camera;
   (b) third terminal means to be connected with said second terminal means when said accessory device is mounted on the camera and third and fourth ground terminals to be independently connected with said first and second ground terminals, respectively;
   (c) fourth terminal means to be connected with said first terminal means when said accessory device is mounted on the camera;
   (d) a motor circuit connected to said third terminal means and said third ground terminal, and being supplied with power through said third terminal means and said third ground terminal, first electrical conductor means being connected between said third terminal means and said third ground terminal; and
   (e) a second electric circuit having input terminal means and connected to said third terminal means and said fourth ground terminal, said second electric circuit being supplied with power through said third terminal means and said fourth ground terminal, second electrical conductor means embodied separately from said first electrical conductor means being connected between said third terminal means and said fourth ground terminal, and the input terminal means connected with said fourth terminal means to operate said second electrical circuit in accordance with control signals provided through said fourth terminal means.

6. An accessory device according to claim 5, wherein wherein said second terminal means of the camera includes first and second power supply terminals, and wherein said third terminal means includes one terminal connected to a power supply line of said motor circuit and another terminal connected to a power supply line of said second electric circuit, said first and second power supply terminals being independently connected respectively with said one and such other terminal of said third terminal means.

7. An accessory device according to claim 6, wherein said power source includes a battery and a power source circuit generating an output based upon an output of said battery, said first power supply terminal being connected to receive the output of the battery and said second power supply terminal being connected to receive the output of said power source circuit.

8. A camera system comprising:
   (a) a camera including:
      (1) a power source having first and second output sides,
      (2) a first electric circuit for producing an information signal, and
      (3) camera terminal means including power supply terminal means connected with said first output side of said power source and first and second terminals connected to said second output side of said power source, and information terminal means for providing said information signal; and (b) a lens device including:
 (1) a motor circuit,
 (2) a second electric circuit having input terminal means, and
 (3) lens device terminal means including lens device power supply terminal means to be connected with said power supply terminal means of the camera and third and fourth terminals to be independently connected with the first and the second terminals of the camera, respectively, said lens device power supply terminal means being connected with the power supply lines of the motor circuit and the second electric circuit, said third terminal being connected with a ground line of the motor circuit, said fourth terminal being connected with a ground line of the second electric circuit, said lens device terminal means also including lens device information terminal means to be connected with said information terminal means of the camera and connected to said input terminal means of said second electric circuit, said second electric circuit being operative in accordance with said information signal provided through such information terminal means.

9. A camera system according to claim 8, wherein said power source includes a battery having said first and second output sides and a power source circuit generating an output based upon an output of said battery, and wherein the power supply terminal means of said camera includes a first power supply terminal connected with said first output side of the battery and a second power supply terminal connected with the output of said power source circuit, the power supply terminal means of the lens device including a third power supply terminal to be connected with said first power supply terminal to supply electric power to the motor circuit and a fourth power supply terminal connected with said second power supply terminal to supply electric power to the second electric circuit.

10. A camera system according to claim 8, wherein the power supply terminal means of said camera includes first and second power supply terminals and the power supply terminal means of the lens device includes third and fourth power supply terminals to be independently connected with the first and second power supply terminals, respectively, wherein electric power is supplied through the third power supply terminal to the motor circuit and through the fourth power supply terminal to the second electric circuit.

11. A camera system according to claim 9, wherein said power supply terminal means of the lens device and said third and fourth terminals are arranged along an inside peripheral area of a mount provided on said lens device to connect the camera thereto.

12. An accessory device constituting at least part of a photographic optical system and adapted to be mounted on a camera, said camera including a power source therein, a mount, a first electric circuit for producing control signals, first terminal means for outputting said control signals, second terminal means for providing power from said power source, and first and second ground terminals for the power source, said first and second ground terminals being connected to said power source through separate electrical conductors, said accessory device comprising:

(a) means for attaching the accessory device onto said mount of the camera;

(b) third terminal means to be connected with said second terminal means when said accessory device is mounted on the camera and third and fourth ground terminals to be independently connected with said first and second ground terminals, respectively;

(c) fourth terminal means to be connected with said first terminal means when said accessory device is mounted on the camera;

(d) a motor circuit connected between said third terminal means and said third ground terminal and being supplied with power through said third terminal means and said third ground terminal; and (e) a second electric circuit having input terminal means and connected between said third terminal means and said fourth ground terminal for prevention of destruction of said second electrical circuit and being supplied with power through said third terminal means and said fourth ground terminal, and the input terminal means of said second electric circuit being connected to said fourth terminal means, said second electric circuit being operative in accordance with control signals provided through said fourth terminal means.

13. An accessory device according to claim 12, wherein said second terminal means of the camera includes first and second power supply terminals, and said third terminal means includes one terminal connected to a power supply line of said motor circuit and another terminal connected to a power supply line of said second electric circuit, said first and second power supply terminals being independently connected respectively with said one and such other terminal of said third terminal means.

14. An accessory device constituting at least part of a photographic optical system and adapted to be mounted on a camera, said camera including a power source therein, a mount, a first electric circuit for producing control signals, first terminal means for outputting said control signals, second and third terminal means for supplying power from said power source, and first and second ground terminals for said power source, said first and second ground terminals being connected to said power source through separate electrical conductors, said accessory device comprising:

(a) means for attaching the accessory device onto said mount of the camera;

(b) fourth and fifth terminal means to be independently connected with said second and third terminal means, respectively, when said accessory device is mounted on the camera and third and fourth ground terminals to be independently connected with said first and second ground terminals, respectively, said fourth terminal means and said third ground terminal being arranged so as to supply power to a motor circuit, said fifth terminal means and said fourth ground terminal being arranged so as to supply power to a second electric circuit; and (c) sixth terminal means to be connected with said first terminal means when said accessory device is mounted ont he camera, said sixth terminal means being arranged to transmit said control signals to an input terminal means of said second electric circuit for operating said second electric circuit in accordance with said control signals.

15. A camera system comprising:

(a) a camera including:
 (1) a power source having first and second output sides,
 (2) a first electric circuit for producing an information signal, and
 (3) camera terminal means including first and second power supply terminal means connected to said first output side of said power source and first and second ground terminals connected to said second output side of said power source, and information terminal means for providing said information signal; and (b) a lens device including:
  (1) a motor circuit,
  (2) a second electric circuit having input terminal means, and
  (3) lens device terminal means including first and second lens device power supply terminal means to be independently and respectively connected with said first and second power supply terminal means of the camera and third and fourth ground terminals to be independently connected with the first and the second ground terminals of the camera, respectively, said first lens device power supply terminal means being connected with the power supply line of the motor circuit and said second lens device power supply terminal means being connected with the power supply line of the second electric circuit, said third ground terminal being connected with a ground line of the motor circuit, said fourth ground terminal being connected with a ground line of the second electric circuit, said lens device terminals means also including lens device information terminal means to be connected with said information terminal means of the camera and connected to said input terminal means of said second electric circuit, said second electric circuit being operative in accordance with said information signal provided through such information terminal means.

* * * * *

UNITED STATES PATENT AND TRADEMARK OFFICE
CERTIFICATE OF CORRECTION

PATENT NO. : 6,183,145 B1
APPLICATION NO. : 07/607147
DATED : February 6, 2001
INVENTOR(S) : Yoshihiko Aihara et al.

It is certified that error appears in the above-identified patent and that said Letters Patent is hereby corrected as shown below:

Col. 1, line 7, delete "Feb. 10, 1997" and insert -- Feb. 10, 1987 --.
Col. 12, line 56 delete "ont he camera"and insert -- on the camera --.
Col. 14, line 4, after "third" delete "ground".

Signed and Sealed this

Thirtieth Day of January, 2007

JON W. DUDAS
*Director of the United States Patent and Trademark Office*